United States Patent [19]

Kosugi et al.

[11] Patent Number: 4,787,571

[45] Date of Patent: Nov. 29, 1988

[54] AUTOMATIC LOADING HORIZONTAL TYPE OF OPEN-REEL MAGNETIC TAPE DRIVE UNIT

[75] Inventors: Ken-ichi Kosugi; Yuuji Asahara; Kazumi Watanabe, all of Tokyo, Japan

[73] Assignee: Anritsu Electric Company Limited, Tokyo, Japan

[21] Appl. No.: 16,050

[22] Filed: Feb. 18, 1987

Related U.S. Application Data

[62] Division of Ser. No. 573,896, Jan. 25, 1984, Pat. No. 4,653,704.

[30] Foreign Application Priority Data

Jan. 31, 1983 [JP] Japan .................................. 58-14418

[51] Int. Cl.[4] ...................... G11B 15/32; G11B 15/38; G11B 15/43
[52] U.S. Cl. ..................................... 242/195; 226/91; 226/97
[58] Field of Search .................... 242/195; 226/91, 92, 226/97; 360/90, 96.1–96.6

[56] References Cited

U.S. PATENT DOCUMENTS

| | | | |
|---|---|---|---|
| 3,788,572 | 1/1974 | Wroblewski | 242/195 X |
| 3,818,503 | 6/1974 | Hosono et al. | 242/195 X |
| 3,910,526 | 10/1975 | Mosciatti | 242/195 X |
| 4,243,186 | 1/1981 | Peter et al. | 242/195 |
| 4,448,369 | 5/1984 | Watanabe | 242/195 |
| 4,620,678 | 11/1986 | Kumakura et al. | 242/195 |

*Primary Examiner*—John M. Jillions
*Attorney, Agent, or Firm*—Jordan and Hamburg

[57] ABSTRACT

A horizontal type of open-reel magnetic tape drive unit automatically clamps a tape reel in a drive section after the reel is inserted, then seperates the free end of the tape from the reel, and guides the free end of the tape along a tape transport path to be wound onto a take-up hub, with these separation and guidance operations being performed by a small number of high pressure air jets. Pressure sealing of the unit is unnecessary, and the overall configuration is simple and easily manufactured.

9 Claims, 16 Drawing Sheets

AUTOMATIC LOADING HORIZONTAL TYPE OF OPEN-REEL MAGNETIC TAPE DRIVE UNIT

This is a division of application Ser. No. 573,896, filed Jan. 25, 1984, now U.S. Pat. No. 4,653,704.

BACKGROUND OF THE INVENTION

The present invention relates to a magnetic tape drive unit for use in data processing and computer applications, and in particular to a low-profile horizontal type of open-reel magnetic tape drive unit in which the magnetic tape is threaded from the tape reel to the take-up hub completely automatically, after the reel is inserted. The method of automatic threading is such that it is not necessary to hermetically seal the unit, and in fact such a magnetic tape drive unit can be operated equally well with or without a cover, and so can be mounted in any of a variety of ways. For example, the unit can simply be placed horizontally within a drawer.

There is a need at present for an automatic tape threading type of magnetic tape drive unit for use in data-processing and computer applications which would have a simple mechanical configuration, for reduced manufacturing cost, and could be disposed horizontally (i.e. with the tape running along a substantially horizontal path) so that the unit has a low profile, suitable for rack mounting or drawer mounting. The need for an automatic threading capability is due to the fact that manual threading of the tape in such units will frequently result in damage to the tape, and moreover is extremely time-consuming for the operator. Manural threading can of course be eliminated if the tape is disposed within cassettes, such as are widely used for video recording. However this leads to a very considerable increase in the amount of space required for storing the tapes, and hence is highly undesirable. The need for a low profile is self-evident, since almost all of the other components of a data-processing installation are of an essentially flat, horizontal shape, and a vertical configuration is basically incompatible with drawer or rack mounted equipment. Various types of automatic-threading magnetic tape drive units are known in the prior art. However most of these are of a vertical configuration, which is undesirable for the reasons discussed above, and have a generally complex mechanism which is expensive to manufacture. The basic reason for the use of an upright configuration is that this enables the action of gravity on the tape to be employed, to assist in guiding the tape along a desired route in conjunction with other means such as air jets.

An automatic-threading magnetic tape drive unit having a horizontal configuration has been described by Peter et al (U.S. Pat. No. 4,243,186). This utilizes suction, created at the take-up hub of the unit, to produce a current of air flowing from the exterior and along a path from the tape reel to the take-up hub. As stated in the Peter et al specification, such a system utilizes an air flow having a high rate of flow at low pressure. With such a magnetic tape drive unit, it is necessary to hermetically seal the unit by a cover, to ensure that the air flow is directed only along the desired path such as to transport the free end of the tape to the take-up hub, when automatic threading of the tape is being performed In addition, due to the large rate of flow which is necessary, the equipment (i.e. blower fan, fan motor, etc) used to produce the suction must be relatively large, so that the overall size of the magnetic tape drive unit cannot be made extremely compact with a very low profile. Furthermore, it is a basic disadvantage of such an air suction type of magnetic tape drive unit that the air flow has no inherent effect tending to direct the free end of the tape along the center of the tape transport path (i.e. the vertical-walled channel within which the tape runs between the tape reel and the take-up hub). Thus it is found in practice with such a system that the free end of the tape tend to adhere to the walls of the tape transport path, of that the tape tends to become twisted, as it is being led towards the take-up hub, so that correct automatic threading operation cannot be reliably attained. Moreover it is found that with such a system it is difficult to ensure that the free end of the tape will be reliably wound onto the takeup hub, after it has been transported thereto by the air flow along the tape transport path, and the tape may be damaged when it is wound onto the take-up hub.

There is therefore a requirement for a horizontal type of open-reel magnetic tape drive unit which will perform automatic threading of the tape from a reel along a predetermined path (having a magnetic read/write head disposed at some point on that path) to a take-up hub, and automatic winding of the tape onto the take-up hub, in a reliable and accurate manner without damage to the tape or any need for manual intervention. It is also a requirement for such a magnetic tape drive unit that the overall configuration, preferably including means whereby a tape reel is automatically clamped onto a drive shaft when it is inserted into the unit, be simple and easily manufactured at low cost. Such requirements are not met by prior art types of magnetic tape drive units.

SUMMARY OF THE INVENTION

It is an objective of the present invention to overcome the various problems which arise with prior art types of horizontal magnetic tape drive units as described above, and to provide a low-profile horizontal type of magnetic tape drive unit which will perform tape threading from a reel to a take-up hub, and winding of the tape onto the take-up hub, in a completely automatic manner.

A magnetic tape drive unit according to the present invention is essentially of the single-reel type, with the tape being wound from a tape reel onto a take-up hub before read or write operations are performed on the tape, and being rewound onto the tape reel after it has been used. As described with reference to the preferred embodiments, the reel may be of the unenclosed type, or a cartridge may be used to contain and protect the reel. With a magnetic tape drive unit according to the present invention, a tape reel which is loaded into a tape supply section, i.e. by being inserted through a slot to fall into the tape supply section or simply placed in the tape supply section, and the free end of the tape wound on the tape reel is automatically separated from the adjacent tape (to which it tends to adhere) and pulled out to be guided and transported along the center of a tape transport path (comprising a channel of concave shape as viewed from above, disposed horizontally connecting the tape supply section in which the tape reel is mounted and rotated to the tape take-up section containing the take-up hub) to the tape take-up section by high-pressure air flows. The free end of the tape is then guided onto the peripheral face of the rotating take-up hub and set in contact with that peripheral face by winding securing means so as to become wound onto the take-up hub. Thus, after the tape reel has been inserted into the magnetic tape drive unit, threading of the tape from the tape reel onto the take-up hub of the tape take-up section is performed completely automatically, without any human intervention being necessary. It is a basic feature of the present invention that all of the operations of separating the free end of the tape from the tape on the tape reel and guiding and transporting the free end of the tape to the tape take-up section and onto the take-up hub are performed by high-pressure air flows, produced from a small number (e.g. FIGS. 3 or 4) high-pressure air ejection outlets supplied from high-pressure air supply means such as a blower fan. The operation of these high-pressure air flows is not affected by the state of sealing of the unit within a cover, so that the use of such a cover is purely optional. The high-pressure air flows act to guide the free end of the tape along the central region of the tape transport path, which can have any desired curved shape, so that the free end of the tape does not come into contact with the side walls of the channel through which is moves. In this way, the problems of the tape adhering to the side walls or becoming twisted, which arise with the prior art, are eliminated.

In addition, with a magnetic tape drive unit according to the present invention, the tape reel is automatically clamped onto a drive motor shaft in the tape supply section after manual insertion into the tape supply section, and is automatically unclamped when the tape has been rewound after use and is to be removed. The means for implementing this clamping and unclamping of the tape reel are extremely simple mechanically by comparison with prior art means for performing such tape reel clamping, although highly effective, and can be manufactured at low cost.

It is another important feature of a magnetic tape drive unit according to the present invention that means are provided for automatically separating the free end of the tape from adjacent portions of the tape wound on the tape reel, before the free end of the tape is led to the tape take-up section. Due to the nature of magnetic tape, which generally comprises a smooth plastic base, the free end of the tape will naturally tend to adhere to adjacent portions of the tape. This can cause problems with prior art types of unit, in which no specific means are provided for separating the free end of the tape. With a magnetic tape drive unit according to the present invention, such separation of the free end of the tape is performed in a simple and effective manner by a high-pressure air flow, in combination with rotation of the reel in an appropriate direction.

As a result of utilizing high-pressure air flows to guide and transport the free end of the tape onto the take-up hub, it is not necessary to seal a magnetic tape drive unit according to the present invention against the atmosphere, and in fact such a unit can be operated without a cover if desired. It will of course be generally desirable to utilize some form of cover or container to prevent the entry of dust etc into the interior of the mechanism. However the elimination of the need for hermetic sealing of the magnetic tape drive unit represents a significant advantage of the present invention over a magnetic tape drive unit which employs a vacuum suction system to perform automatic tape threading.

A magnetic tape drive unit according to the present invention basically comprises the following. A base is fixed horizontally within a housing, and a tape supply section is disposed in the base. The tape supply section is provided with means for automatically clamping a tape reel onto a drive shaft, e.g. the shaft of a drive motor, with the rotation of the drive shaft and hence the tape reel being controlled by control signals from a control section. A tape take-up section is also provided on the base, and includes a take-up hub driven by a motor in response to control signals, for winding the tape from the tape supply section. A tape transport path comprising an elongated open channel is formed in the base, between the tape supply section and the tape take-up section, along which the tape runs after it has been wound onto the take-up hub. A head section disposed in the tape transport path between the tape supply section and the tape take-up section includes magnetic head means for performing read and write operations on the moving tape. A plurality of high-pressure air flows are produced by high-pressure air ejection outlets, supplied from means such as a blower fan, with these high-pressure air flows being disposed such as to act to separate the free end of the tape from adjacent portions of the tape on the tape reel, to guide and transport the free end of the tape after separation, along the central region of the tape transport path towards the tape take-up section, and guiding and transporting the free end of the tape onto the take-up hub in the tape take-up section. Winding securing means, such as an air flow guide surface acting to direct a flow of air towards the take-up hub periphery operating in conjunction with a roller bearing against the periphery of the take-up hub, act to wind the free end of the tape onto the rotating take-up hub after it has ben guided and transported thereto. The latter winding securing means can also be arranged such as to ensure evenness of winding the tape onto the take-up hub. A tape start/end detection section serves to detect passage of the leading end and the trailing end of the tape, and produce detection signals to indicate such passage. A tension application mechanism acts to produce a predetermined amount of tension in the tape after it has been wound onto the take-up hub. Tape securing confirmation means serve to produce signals indicating that the tape has become securely wound onto the take-up hub. A tape control section comprises electronic circuits which receives various detection signals from various sections, and produces control signals which control the operation of the motors driving the tape reel and the take-up hub.

DESCRIPTION OF THE PREFERRED EMBODIMENTS

Figure 1:
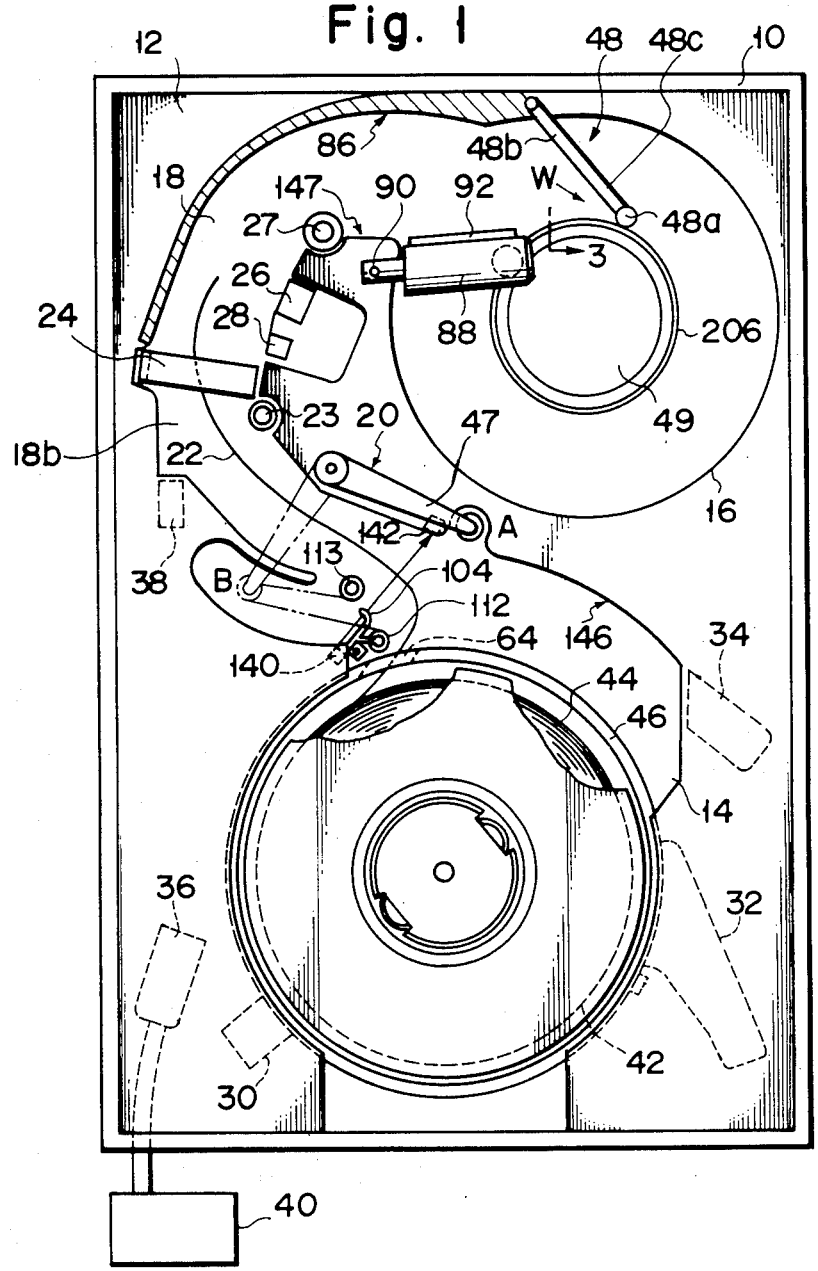
FIG. 1 is a plan view of a first embodiment of a magnetic tape drive unit according to the present invention, for use with cartride-enclosed tape reels.

Embodiments of a magnetic tape drive unit according to the present invention, and various mechanisms used therein, will now be described with reference to the drawings. FIG. 1 is a plan view of a first embodiment of a magnetic tape drive unit according to the present invention. Numeral 12 denotes a base which is fixedly attached within a housing 10. Housing 10 is designed to be mounted horizontally, with base 12 also being disposed horizontally.

Numeral 14 denotes a tape supply section, and numeral 16 denotes a tape take-up section, each formed in a concave shape (as viewed from above) at opposite ends of base 12. Numeral 18 denotes a tape transport path, comprising an open channel formed in base 12 (i.e. having a concave shape as viewed from above), having an identical depth to the tape supply section and tape take-up sections, and which is curved into an S-shaped path connecting the tape supply section 14 and tape take-up section 16.

Numeral 20 denotes a tension application mechanism, which acts to apply a predetermined degree of tension to a magnetic tape (hereinafter simply referred to as "tape") 22 after the tape has been wound onto a take-up hub as described hereinafter. Numeral 24 denotes a tape start/end detection section, which acts to detect the start and the end of tape 22. Numeral 26 denotes a magnetic read/write head, for performing read and write operations on tape 22, and numeral 28 denotes a cleaner for cleaning tape 22. As shown, tension application mechanism 20, tape start/end detection section 24, magnetic head 26 and cleaner 28 are all disposed at intermediate points along tape transport path 18. Numerals 30, 32, 34 and 38 denote high-pressure air ejection outlets which serve to produce high-pressure air flows, whose functions are described in detail hereinafter. These high-pressure air flows are generated by an air supply applied through a supply outlet 36 from a high-pressure air supply source 40, which can comprise means such as a blower fan connected by pipes or ducts to high-pressure air supply outlet 36, the air supply then passing from supply outlet 36 through the interior of base 12, to be output from high-pressure air ejection outlets 30, 32, 34 and 38.

Numeral 42 denotes the reel on which the tape is wound. For ease of description, the portion of tape following the free end of the tape after separation from the coil of tape wound on the reel will be designated by reference numeral 22, while the tape which is still wound on reel 42 will be designated by numeral 44. In this embodiment, the reel 42 is enclosed within a cartridge 46, to protect the tape when it is removed from the unit.

Basically, air ejection outlets 30 and 32 act to produce air currents which serve in conjunction with rotation of reel 42 in an appropriate direction to separate the free end of the tape from adjacent portions of the tape 44, immediately after the cartridge is inserted into tape supply section 14, The high-pressure air flow produced by high-pressure air ejection outlet 34 acts, in conjunction with the air flows produced by air ejection outlets 30 and 32, to pull the free end of the tape into the tape transport path 18, and to guide and transport the free end of the tape along the center of tape transport path 18 towards tape take-up section 16. The air flow produced by high-pressure air ejection outlet 38 is directed such as to modify the direction of advancement of the free end of the tape as it moves towards the tape take-up section, as well as to transport the free end of the tape towards the tape take-up section, so that the tape follows the curvature of the tape transport path 18, and continues to move substantially along the center of that path. Numeral 48 denotes a winding securing mechanism, which serves to guide the free end of the tape into contact with the peripheral surface of a take-up hub 49 in the tape take-up section. At that time, the take-up hub 49 is rotating, and winding securing mechanism 48 functions such as to cause tape 22 to become wound onto take-up hub 49, as described hereinafter. In this embodiment, the winding securing mechanism 48 also constitutes means for applying pressure to tape 22 after it has been wound onto take-up hub 49, so as to prevent non-uniformity of winding of the tape on take-up hub 49.

Figure 2:
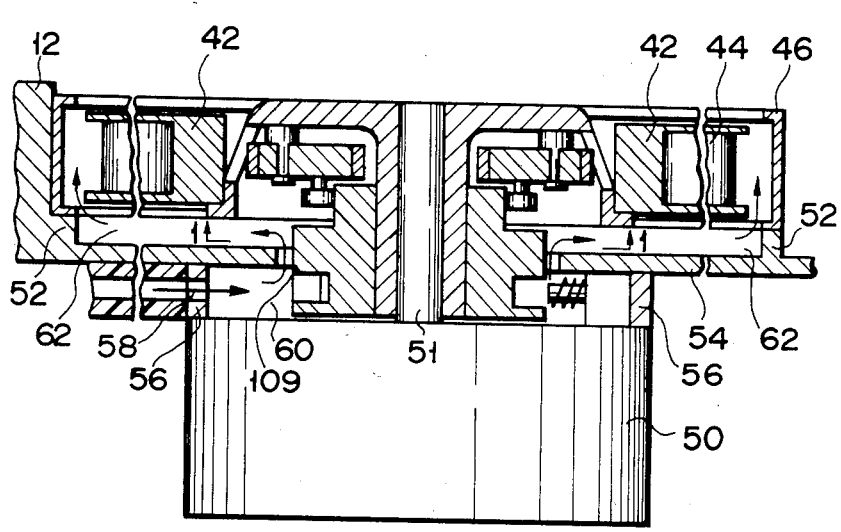
FIG. 2 is a cross-sectional view of a tape drive section in the embodiment of FIG. 1.

The tape supply section 14 will now be described with reference to FIGS. 2 to 4. FIG. 2 is a vertical cross-sectional view of tape supply section 14, and illustrates the condition of tape supply section 14 immediately after a cartridge 46 has been inserted into the magnetic tape drive unit, before the reel is clamped in place. Numeral 50 denotes a drive motor and numeral 51 the drive shaft of motor 50.

The cartridge support section 52 is disposed around the periphery of the lower face of cartridge 46, on top of the convex base section 54 of tape supply section 14. A shield member 56 is disposed between the upper end of drive motor 50 and the convex base portion 54, and acts to shield the space between drive motor 50 and the base. In addition, a high-pressure air ejection outlet 30 is disposed at one end of shield member 56. Thus, the high-pressure air flow which is ejected from air ejection outlet 30 flows through the air gap 60, and through the space between cam 109 and convex base portion 54, enters space 62 formed between reel 42 and base portion 54, and furthermore flows from the gap at the lower end of reel 42 into the interior of cartridge 46. The air flow which passes into cartridge 46 flows towards and out through tape leadout aperture 64.

Figure 3:
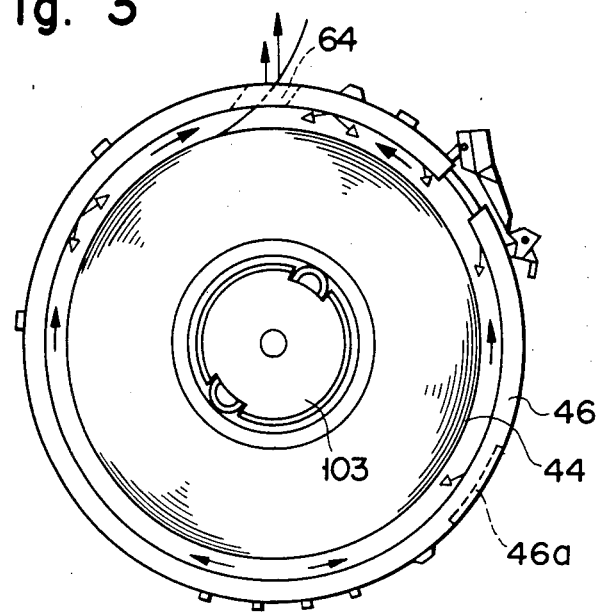
FIG. 3 and FIG. 4 are diagrams for describing tape free end separation means in the embodiment of FIG. 1.
Figure 4:
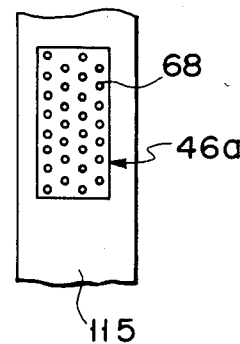

FIG. 3 is a diagram for describing the way in which the free end of the tape is drawn out of cartridge 46. The dark arrows shown in FIG. 3 indicate the direction of movement of the air flow, while the lengths of the arrows indicate the strength of the air flow. Cartridge 46 has an outer peripheral wall which is formed into a hollow shell configuration i.e. a space is formed between vertical peripheral walls of cartridge 46. In addition to tape leadout aperture 64 provided in cartridge 46, an air entry aperture section 46a is provided with a plurality of small through-hole apertures 68, formed in the outer vertical wall of cartridge 46 as shown in FIG. 4. This air entry aperture section 46a is positioned immediately opposite and adjacent to the high-pressure air ejection outlet 32, formed in the right-hand side of tape supply section 14. Thus, the high-pressure air flow from high-pressure air ejection outlet 32 flows through the apertures 68 into the interior of the space formed between the vertical peripheral walls of cartridge 46. A number of small through-hole apertures are formed in the inner peripheral vertical wall of cartridge 46, and the air from high-pressure air ejection outlet 32 thereby flows through these inner apertures into the interior of cartridge 46. The air which is ejected from these inner apertures, in directions indicated by the white arrows in FIG. 3, is directed onto tape 44 in such a way as to separate the free end of tape 44 wound on reel 42 from adjacent portions of the tape (to which the free end of the tape naturally tends to adhere, due to the form of such magnetic tape).

At the same time, reel 42 is rotated by motor 50, in the clockwise direction as viewed from above (i.e. in a direction such as to assist separation fo the free end of the tape from the adjacent tape portions). As a result of this rotation and the inwardly directed air flows described above, the free end of the tape is reliably separated from the adjacent tape portions.

The air flow resulting from the output of high-pressure air ejection outlet 30 has a distribution illustrated by the black arrows in FIG. 3. Due to the strength of the air flow which enters the interior of cartridge 46 from air ejection outlet 30, there is an increase in the air pressure within cartridge 46 above the atmospheric pressure exterior to tape leadout aperture 64. As a result of this pressure difference, the free end of the tape is pulled out through tape lead-out aperture 64. The free end of the tape is thereby reliably transported out of cartridge 46, by the air flowing out of cartridge 46 through tape leadout aperture 64. There is no danger that the free end of the tape will drop into the angular space between the lower side of reel 42 and cartridge 46, since this is prevented by the flow of air into the interior of cartridge 46 through the annular aperture formed between the lower side of reel 42 and cartridge 46, as described hereinabove.

More specifically, after the free end of the tape has been separated from the adjacent tape it is led along the internal vertical wall face of cartridge 46, and when it arrives at tape lead-out aperture 64 the free end of the tape is pulled out through that aperture by the outwardly flowing air current.

As a result of the air flows from high-pressure air ejection outlets 34 and 36, disposed on the left and right sides of base 20 as shown in FIG. 1, (with the main effects being produced by air ejection outlet 34), the free end of the tape which emerges from tape lead-out aperture 64 is transported and guided to portion 18b of the tape transport parth 18. As a result of the air flow from high-pressure air ejection outlet 38, provided to the left of the central region of base 20, the direction of advancement of the free end of the tape is directed in a curved path, following the direction of the center of tape transport path 18, as illustrated in FIG. 1. Due to the combined actions of the air flows from high-pressure air ejection outlets 34 and 38, the free end of the tape is thereby guided past tape start/end detection section 24.

Embodiments of tape start/end detection section 24 will now be described, referring first to FIGS. 5 to 8.

Figure 5:
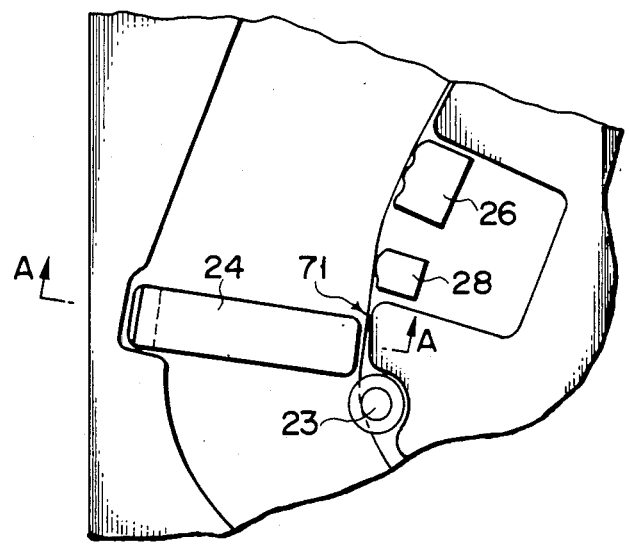
FIG. 5 is an expanded view in plan of a portion of the embodiment of FIG. 1, for describing a tape end/start detection section.
Figure 6:
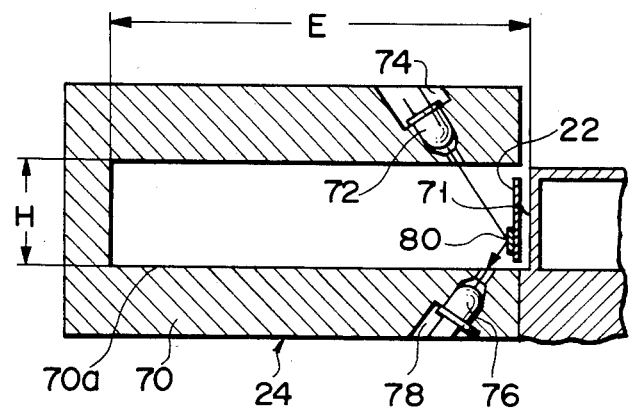
FIG. 6 is a cross-sectional view of the tape end/start detection section of FIG. 5.

FIG. 5 is a partial expanded plan view of the embodiment of FIG. 1, illustrating the portions of the unit adjacent to tape start/end detection section 24. The shape of the tape start/end detection section, as seen in vertical cross-section, is shown in FIG. 6, and this is positioned in the tape transport path as shown in FIG. 5. Numeral 70 denotes a member having a rectangular cross-sectional shape, open at one side as shown in FIG. 6. The closed side of member 70 is positioned on the opposite side of the tape transport path from the magnetic read-write head section, while the open side of member 70 is disposed just before the head section. The size of gap H between the top and bottom portions of member 70 is made greater than the width of the tape, by a suitable margin, to ensure that the tape can run freely through tape start/end detection section 24. The upper surface 70a of the lower part of member 70 is arranged to be co-planar with the lower surface of the tape transport path, so that no obstruction will be presented to the tape by member 70.

Numeral 72 denotes a photo-emissive element such as a light-emitting diode, which is mounted obliquely in an aperture 74 in the upper part of member 70, and which projects light towards tape 22 as shown in FIG. 6. Numeral 76 denotes a photo-receptive element which is mounted obliquely in an aperture 78 in the lower part of member 70. The photo-emissive element 72 and photo-receptive element 76 are each mounted such as not to protrude out of member 70 into the tape transport path, so that no obstruction to the movement of the tape is presented by these at any time. Numeral 80 denotes a tape start or tape end mark formed on tape 22, which has a substantially higher degree of reflectance than the tape itself. Light emitted from photo-emissive element 72 falls on this mark and is reflected therefrom as shown, to impinge upon photo-receptive element 76. An electrical signal, i.e, a detection signal, is thereby produced by photo-receptive element 76 and this is sent to a control section (described hereinafter) to indicate that the end of the tape or the start of the tape has moved past tape start/end detection section 24.

With such a configuration for tape start/end detection section 24, the tape transport path is left wide and completely unobstructed, to thereby facilitate automatic tape threading from the tape supply section to the tape take-up section. This is in contrast with conventional types of tape start/end detection means, which generally obstruct or narrow the tape transport path to a substantial degree.

Figure 7:
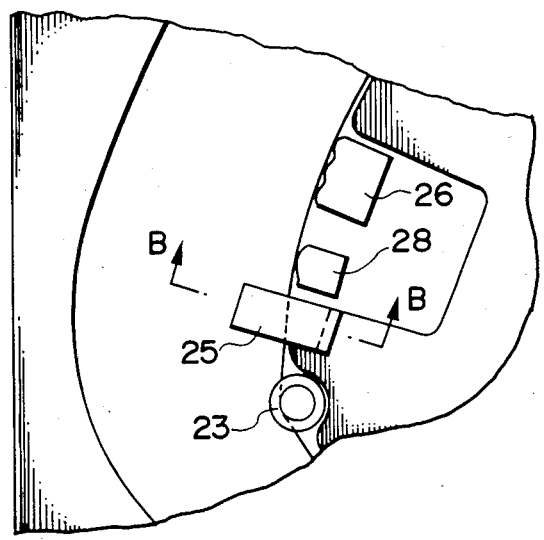
FIG. 7 and FIG. 8 are diagrams for describing another example of a tape end/start detection section.
Figure 8:
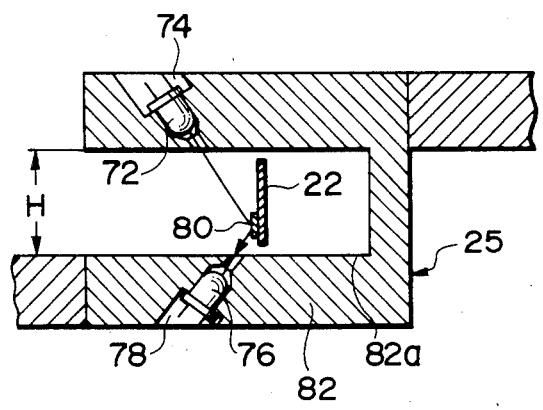

FIG. 7 and FIG. 8 show another embodiment of a tape start/end detection selection according to the present invention. In this case the tape start/end detection section, denoted by numeral 25, again comprises a mbmer 82 having a rectangular cross-sectional shape, open at one side, and is mounted with the open end thereof positioned in the tape transport path and the closed end disposed on the same side of the tape transport path as the magnetic read-write head. The operation of this embodiment is identical to that of the embodiment of FIGS. 5 and 6 described above. As in the previous embodiment, the upper face 82a of the lower part of member 82 of tape start/end detection section 25 is made co-planar with adjacent areas of the tape transport path, and the photoemissive element 72 and photo-receptive element 76 do not protrude outwards from member 82 into the tape transport path, so that no obstruction is presented to the movement of the tape during automatic threading or normal read-write operation of the unit.

After passing through tape start/end detection mechanism section 24, the free end of the tape moves past a cleaner 28 and magnetic read/write head 26, and is then guided onto the periphery of take-up hub 49 by the action of winding securing mechanism 48. Specifically, the high pressure air flow from air ejection outlet 38 passes along vertical wall portion 86 of the tape transport path, and then is directed towards take-up hub 49 by shape and position of winding securing mechanism 48. The air flow thus directed, designated as W in FIG. 1, acts to lead the free end of the tape onto the peripheral face of takeup hub 49.

An encoder 88 is provided in tape take-up section 16, and signals produced by this are utilized to hold the speed of movement of the tape at a constant value, when the magnetic tape drive unit is in normal read or write operation. Encoder 88 moves about a shaft 90 as a center of rotation, and floats on the tape which is wound on take-up hub 49. A shield plate 92 is provided on encoder 88, and the provision of this shield plate, in conjunction with the particular shape of a portion 147 of the vertical side wall of the tape transport path, serve to ensure that the free end of the tape will not accidentially enter the tape take-up section 16 on the wrong side of take-up hub 49 (i.e. such as to move around hub 49 in a counter-clockwise direction rather than in a clockwise direction, as viewed in FIG. 1).

Figure 9:
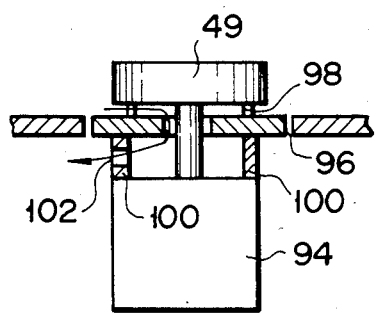
FIG. 9 is a simplified cross-sectional view of a tape take-up section in the embodiment of FIG. 1.

FIG. 9 is a partial cross-sectional view of the tape take-up section 16. This comprises a drive motor 94, with the drive shaft thereof having take-up hub 49 fixedly mounted thereon, a tape dropping prevention plate 96, and a fixed pin 98 which is fixedly attached to take-up hub 49 to rotate therewith. A shield member 100 is disposed between drive motor 94 and tape dropping prevention plate 96, with a suction aperture 102 being formed in shield member 100 through which air flows in the direction of the arrow. This air flows through a pipe (not shown in drawings). to an inlet port of blower section 40 shown in FIG. 1, which produces the supply of high pressure air that is ejected from air ejection outlets 32 to 38 as described above, so that suction is applied at aperture 102. A flat vertical face 48b is provided on an elongated member 48c of winding securing mechanism 48, which redirects the air flowing from apertures 38 etc, towards the periphery of hub 49. This redirected air flow acts to guide the tape free end onto the hub periphery. Elongated member 48c is rotatably mounted on base 12 at one end, and springlocated such as to urge a roller 48a mounted on the opposite end of member 48c, against the periphery of hub 49. As a result, the tape free end, after being guided onto the hub periphery by the redirected air flow, becomes pressed into contact with that peripheral surface and so moved by the rotating hub to pass between the hub surface and roller 48a. In this way, the tape becomes securely wound onto hub 49. After the tape has started to wind onto the hub, the pressure applied by roller 48a on the tape surface acts to ensure evenness of winding of the tape.

As described previously, the free end of the tape is forced onto the peripheral surface of take-up hub 49 by a suitably directed air current. The flow of air through the lower part of take-up hub 49 assists in pulling the free end of the tape onto the hub periphery, thereby assisting in ensuring that the tape is securely woound onto take-up hub 49, in conjunction with the winding securing mechanism 48.

After the tape has been wound onto the take-up hub 49 by the automatic winding securing operations described above, it is necessary to confirm that the tape has been correctly and securely attached to the take-up hub. With this embodiment of the present invention, such confirmation is provided by means which generate signals indicating that the tape is in contact with the external faces of magnetic read/write head 26 and cleaner 28, and means which indicate that a mini-tension arm (described in the following) is held in a specific position.

Figure 10:
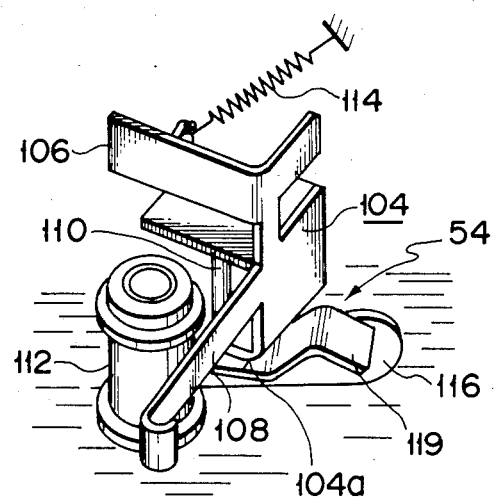
FIG. 10 to FIG. 13 are diagrams for describing a tape tension application mechanism used in the embodiment of FIG. 1.

FIG. 10 is an oblique view of the mini-tension arm mechanism. The mini-tension arm 104 is supported on a convex base portion 54, rotatably mounted on a shaft 110. As shown, the mini-tension arm 104 is provided with a first contact arm 108 and a second contact arm 106 which are disposed substantially mutually at right angles. As described in the following, the lower end of second contact arm 106 is positioned higher than the upper end face of a guid roller 112. The mini-tension arm 104 is provided with a spring 114, which serves to determine a stable position for mini-tension arm 104. The possible stable states of mini-tension arm 104 are described in detail hereinafter. Guide roller 112, which also acts as a stopper for first contact arm 108, is rotatably mounted in base portion 54, and serves to guide the tape. An aperture 116 is formed in base portion 54 adjacent to mini-tension arm 104, and an actuator 119 of a micro-switch (not shown in the drawings) disposed beneath base portion 54, protrudes through aperture 116. Thus, as mini-tension arm 104 moves about shaft 110 as a center of rotation, the lower face 104a of mini-tension arm 104 presses against actuator 119, and operates the micro-switch.

Figure 11:
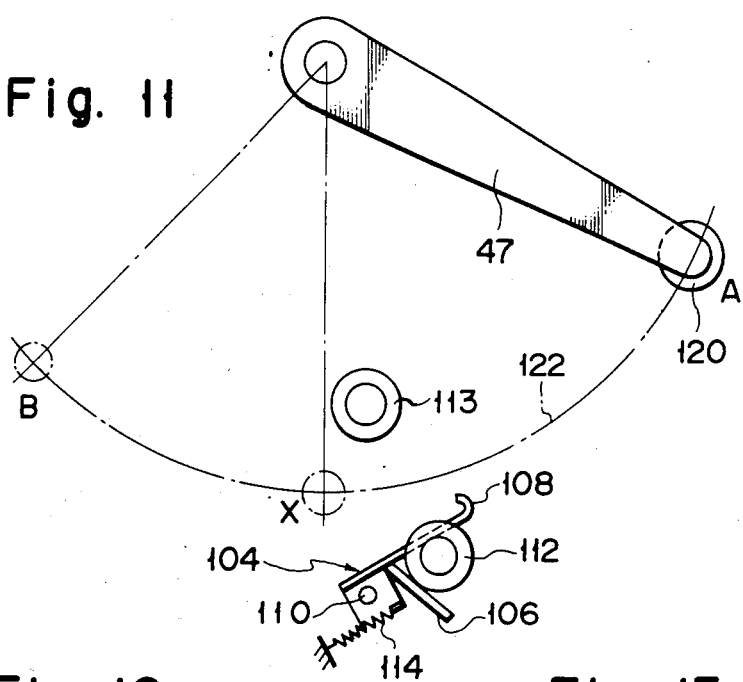
Figure 12:
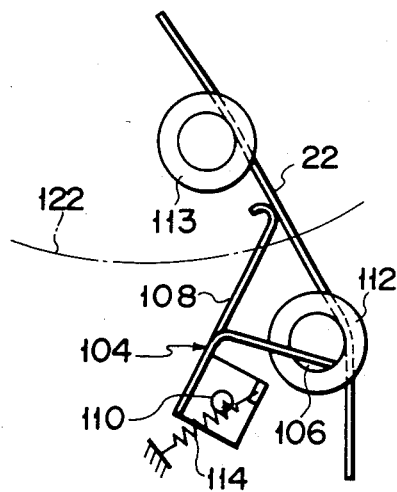
Figure 13:
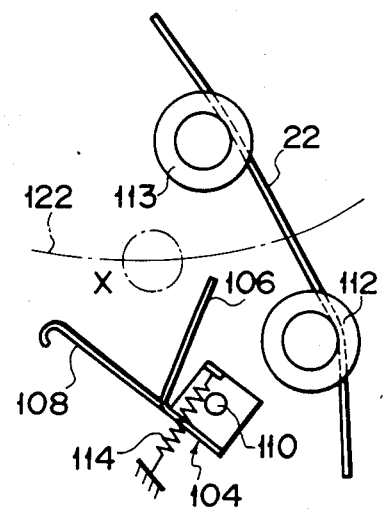

The operation of mini-tension arm 104 will be described further referring to FIGS. 11 to 13. Fig. 11 shows the positions of the mini-tension arm and the tension arm 47, before the tape is wound onto the take-up hub 49. FIG. 12 shows the positions of minitension arm 104 when the tape has been correctly wound on the take-up hub and tension is being applied to the tape. FIG. 13 shows the position of mini-tension arm 104 while the magnetic tape drive unit is in operation.

In FIGS. 11 to 13, numeral 120 denotes a guide roller which is rotatably mounted on the outer end of tension arm 47, and which impinges against the first contact arm 108 and second contact arm 106 of minitension arm 104. This guide roller 120 is used to change the stable state positions of mini-tension arm 104. Numeral 122 denotes the path along which guide roller 120 moves. As shown in FIG. 11, prior to tape 22 being wound on the take-up hub, then due to the action of spring 114 acting about the axis of shaft 110, the first contact arm 108 is held in a stable position in contact with guide roller 112. This condition will be designated as position A of tension arm 47. Positions B and X along movement path 122 of guide roller 120 indicate the range of movement of tension arm 47, that is, the maximum and minimum positions of guide roller 120.

When the free end of the tape from reel 42 in tape supply section 14 is pulled outward and is automatically wound onto take-up hub 49 of tape takeup section 16 as described above, the speed of rotation of take-up hub 49 is made higher than that of reel 42. Thus, as shown in FIG. 12, tension is thereby applied to tape 22 when it has become wound onto hub 49. As a result, the first contact arm 108 of mini-tension arm 104 is set in contact with tape 22, and due to the tension applied to tape 22 the mini-tension arm is moved to the position shown in FIG. 12, i.e. is rotated. Hence, as shown in FIG. 10, actuator 119 of the micro-switch described hereinabove with reference to FIG. 10 is depressed, and the micro-switch is thereby actuated. With mini-tension arm 104 in the position shown in FIG. 12, since spring 114 is pulling such as to rotate mini-tension arm 104 in the clockwise direction (as seen from above) about shaft 110, the tension in tape 22 is reduced. As a result, mini-tension arm 104 is returned to the stable state position shown in FIG. 11. However, in response to the actuation of the micro-switch and a signal produced thereby, tension arm 47 is made to move along path 122 to position B shown in FIG. 12. When this occurs, guide roller 120 on tension arm 47 strikes against contact arm 108 of tension arm 104, acting through tape 22, and mini-tension arm 104 is thereby moved in the counter-clockwise direction, accompanying the motion of tension arm 47. As a result, spring 114 is now positioned on the left hand side of shaft 110, so that the tension force exerted by spring 114 acts to pull on mini-tension arm 104, whereby mini-tension arm 104 rotates about shaft 110 until it is halted by stopper (not shown in the drawings), to finally reach the stable state position shown in FIG. 13.

With mini-tension arm 104 in the stable state position shown in FIG. 13, the length of contact arm 108 is predetermined such that the tip of contact arm 108 does not touch guide roller 120 as the latter moves into position X.

While the magnetic tape drive unit is performing read or write operations, tension arm 47 floats in the region between positions B and X. The guide roller 120 only reaches position X, and as stated above does not touch the second contact arm 106. Thus, while the unit is in operation, tension arm 104 is held in the stable state position shown in FIG. 13.

When operation of the magnetic tape drive unit is terminated, tension arm 47 is moved along path 122 to return to position A. When this occurs, guide roller 120 strikes the tip of second contact arm 106 of minitension arm 104, whereby mini-tension arm 104 moves to the right, rotating about shaft 110. Thus when spring 114 becomes positioned on the right hand side of shaft 110, the tensile force exerted by the spring acts to return mini-tension arm 104 to the stable position shown in FIG. 11. In this way, mini-tension arm 104 implements recovery to the initial stable position. As stated above, due to the tension which is applied to tape 22 when the tape is correctly wound onto the take-up hub, resulting from the differences between the speeds of rotation of the tape reel (i.e. of retainer 103) and the speed of rotation of the take-up hub, mini-tension arm 104 acts on actuator 119 such as to operate the micro-switch. In this way, a tape attachment confirmation signal is produced by the micro-switch. If this signal is not generated within predetermined time after automatic tape threading and attachment operations are initiated, then tape 22 is rewound onto reel 42 and automatic tape attachment operations are restarted.

In the above embodiment, a micro-switch and actuator are used to sense the tension arm position and produce sensing signals accordingly. However various other methods could be used to produce such tape attachment confirmation signals. For example, light from a photo-emissive diode could be directed onto the lower face 104a of mini-tension arm 104, and light reflected therefrom detected by a photoreceptive diode.

Figure 14:
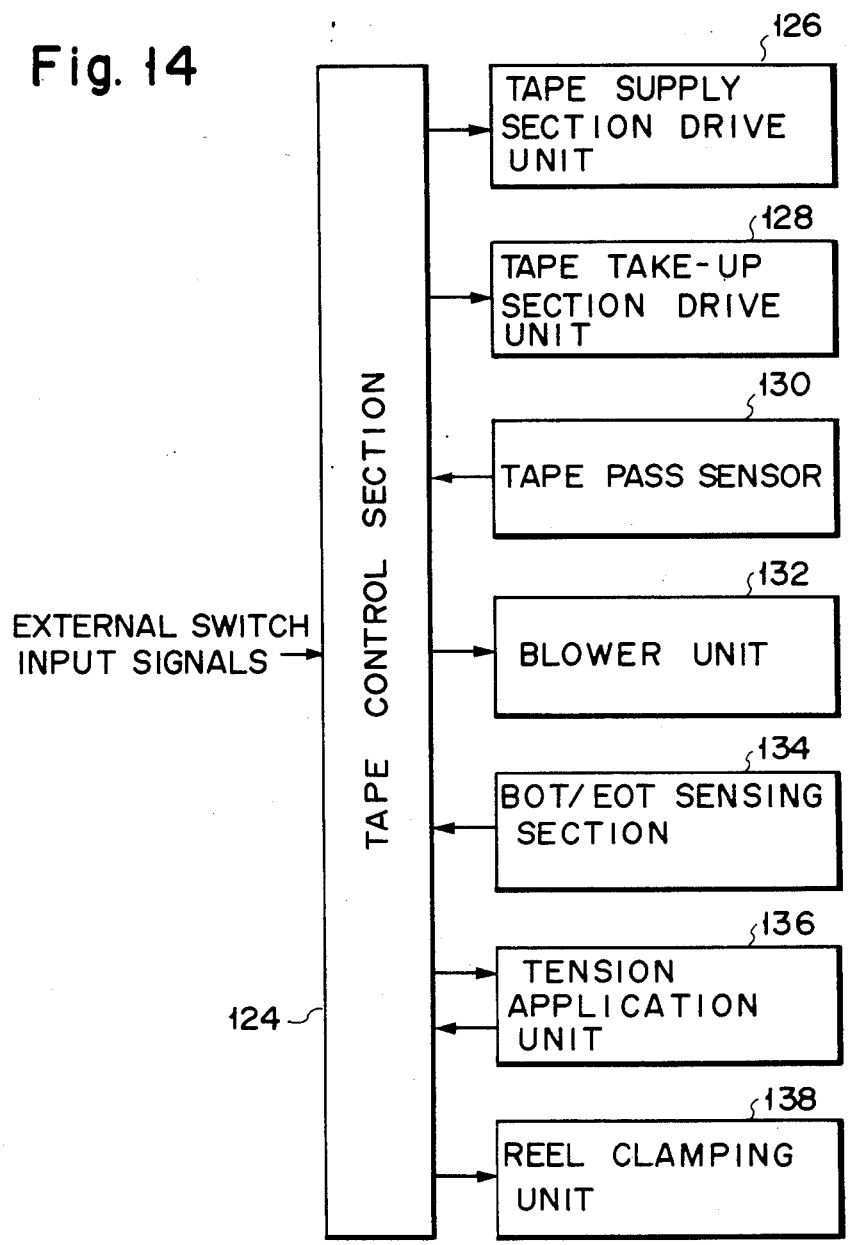
FIG. 14 is a simplified block diagram of means for controlling the overall operation of the embodiment of FIG. 1.

FIG. 14 is a simplified block diagram to illustrate the general configuration of circuit means for controlling a magnetic tape drive unit according to the present invention. Numeral 124 denotes a tape control section 124 which is connected to a tape supply section drive unit 126, to a tape take-up section drive unit 128, to a tape pass sensor 130, to a blower unit 132, to a BOT/EOT sensing section 134, to a tension arm mechanism 136 and to a reel clamping mechanism 138.

The tape control section 124 receives control signals or sensor signals from sensors or other signal generating devices, performs specific processing of these received signals, and in response transmits control signals to the various sections of the magnetic tape drive unit to thereby control automatic tape attachment, operation following automatic tape attachment, rewinding of the tape, etc. The tape supply section drive unit 126 basically corresponds to drive motor 126, while tape take-up section drive unit 128 basically corresponds to drive motor 94. These drive motors are controlled for forward and reverse rotation and for speed of rotation by control signals sent from tape control section 124.

The tape pass sensor 130 comprises means for sensing that the free end of the tape has passed by, and is provided at some intermediate position along tape transport path 18. In the case of the embodiment of FIG. 1, this is provided in the vicinity of tension arm 47, and comprises a photo-emissive diode 140 and a photoreceptive diode 142.

The blower unit 132 serves to supply air under pressure to the high-pressure air ejection outlets 34, 30, etc, and has an air suction inlet which is coupled to suction aperture 102 of take-up section 16. The blower unit 132 is controlled by control signals from tape control section 124 such as to produce air flows whereby the free end of the tape is correctly transported to the take-up hub and wound thereon at the time of automatic tape attachment operation.

The BOT/EOT sensing section 134 corresponds to tape end/start sensor section 24 described in the above, and acts to sense the marks provided on the tape indicating the start (BOT) and end (EOT) of the tape, producing in response corresponding detection signals which are sent to tape control section 124.

The tension arm mechanism 136 provides a predetermined amount of tension on tape 22 in response to control signals from tape control section 124, and also serves to produce tape attachment confirmation signals to indicate when the tape has become correctly attached to the take-up hub, immediately following automatic tape attachment. These signals are sent to tape control section 124. In the previous embodiment, tension arm mechanism 136 is made up of tension arm 47, mini-tension arm 104, etc, described above.

The reel clamping mechanism 138 receives control signals from tape control section 124, and acts to clamp reel 42 in a concentrically fixed relationship with the drive motor shaft, as described in detail hereinafter, after the reel has been inserted into the magnetic tape drive unit.

Figure 15:
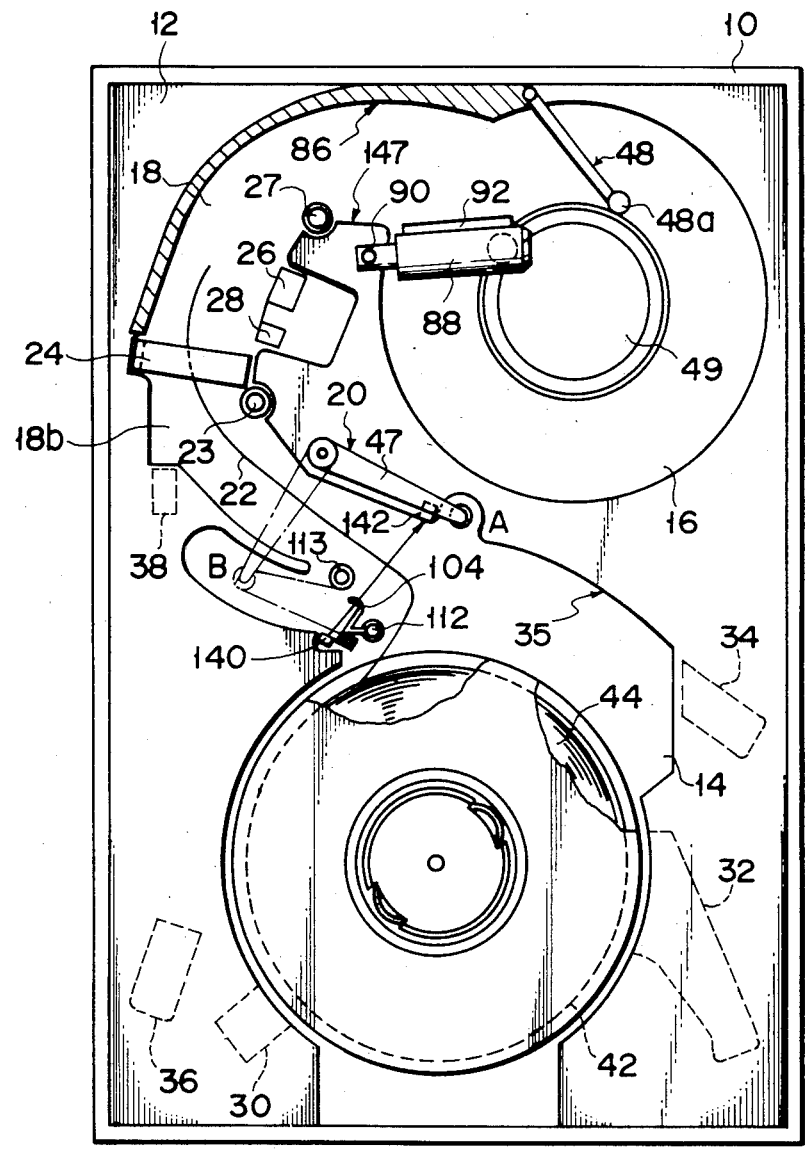
FIG. 15 is a plan view of an embodiment of a magnetic tape drive unit according to the present invention, for use with open tape reels.
Figure 16:
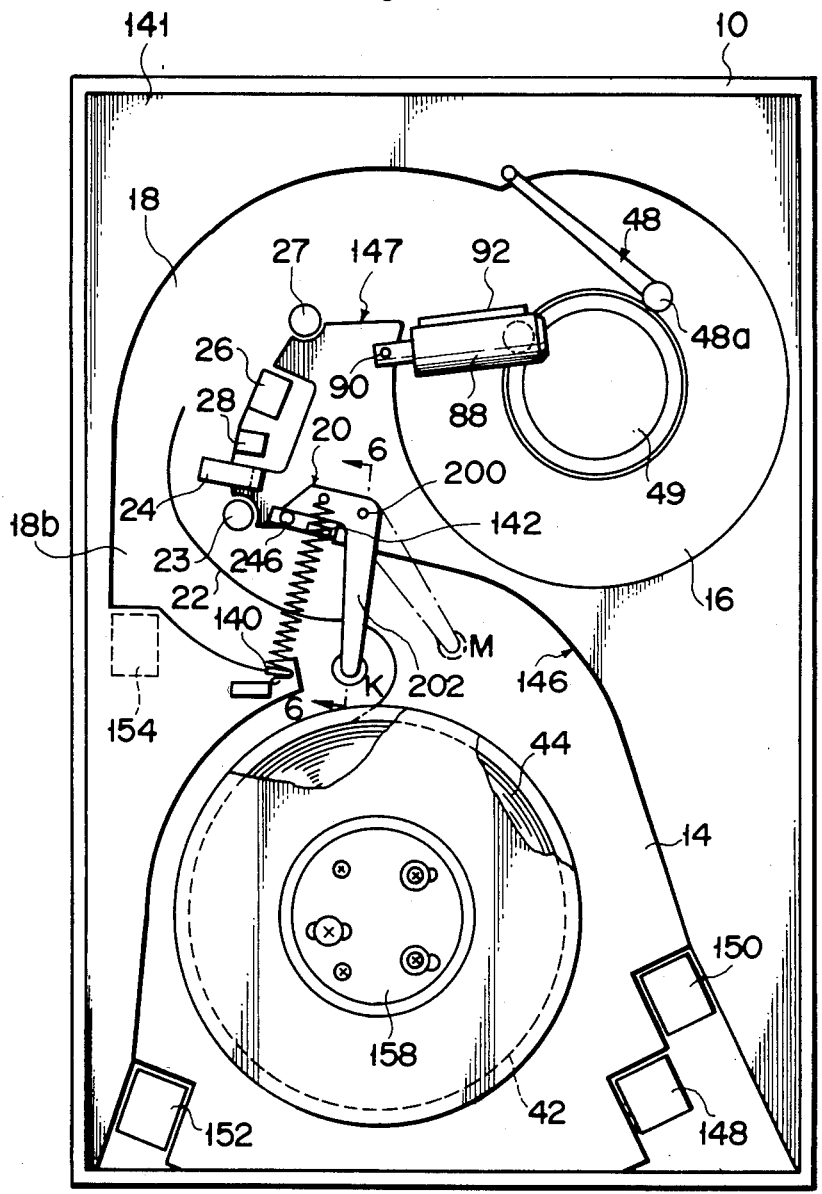
FIG. 16 is a plan view of another embodiment of a magnetic tape drive unit according to the present invention, of open-reel type, having a modified form of tape supply section and tape tension application mechanism.

Referring now to FIG. 15, another embodiment of a magnetic tape drive unit according to the present invention is shown in plan view. This is essentially similar to the embodiment of FIG. 1, but is of openreel design, i.e. the tape reel 42 is not contained within a cartridge as in the case of the previous embodiment. The automatic tape attachment operation for this embodiment is as follows. First, reel 42 is rotated in the clockwise direction, as viewed in FIG. 15, while a high-pressure air flow is produced from outlets 30 and 32 (which can be positioned in a similar manner to that described above for the first embodiment), and from high-pressure air ejection outlets 34 and 38. the high-pressure air flow from outlet 32 impinges upon the surface of tape 14, wound on reel 42, and acts to separate the free end of the tape from adjacent portions of tape. The high-pressure air flow from air ejection outlet 34, and then that from air ejection outlet 36, then act to guide and transport the free end of the tape along the tape transport path, first moving past wall portion 146 towards tension arm mechanism 20, which at this time is in the retracted state. The subsequent operation is similar to that described above for the embodiment of FIG. 1, and so further description will be omitted.s FIG. 16 shows a plan view of another embodiment of an open-reel type of magnetic tape drive unit according to the present invention. This differs from the embodiments described above in the shape of the tape supply section 14 and in the tension application mechanism 20. Numerals 148, 150 152 and 154 denote high pressure air ejection outlets which produce air flows for separating the free end of the tape from adjacent tape 44 wound on reel 42 in the tape supply section and transporting the free end of the tape to the tape take-up section 16, as in the previous embodiment.

In this embodiment, the portion of base 141 containing tape supply section 14 is formed with a broad concave shape, as shown. The high pressure air ejection outlets 148, 150 and 152 are formed in the outer wall of the portion of base 141 containing tape supply section 14, and act to free the outer end of the tape 44 from the reel, and transport this free end of the tape along tape transport path 18. It can thus be understood that the operation of this embodiment is essentially similar to those described hereinabove.

Figure 17:
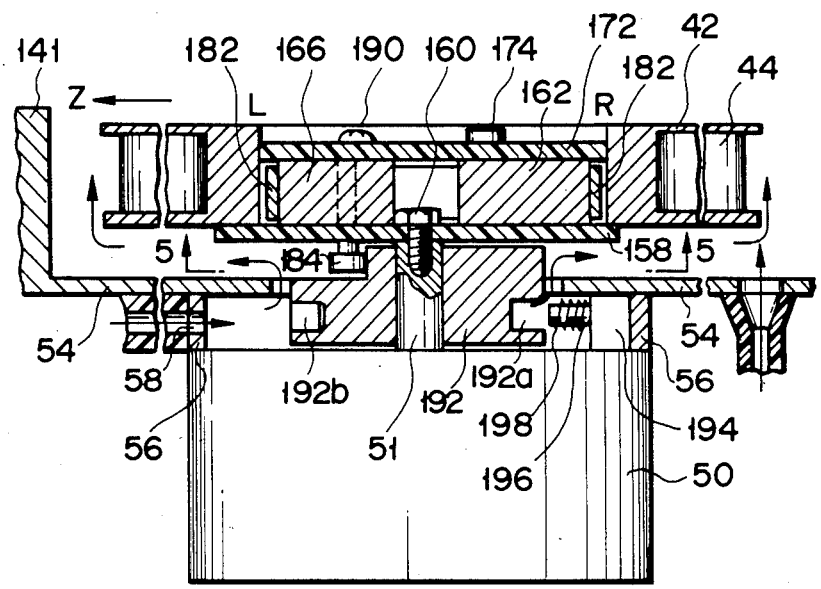
FIG. 17 is a cross-sectional view of a tape supply section in the embodiment of FIG. 16.
Figure 18:
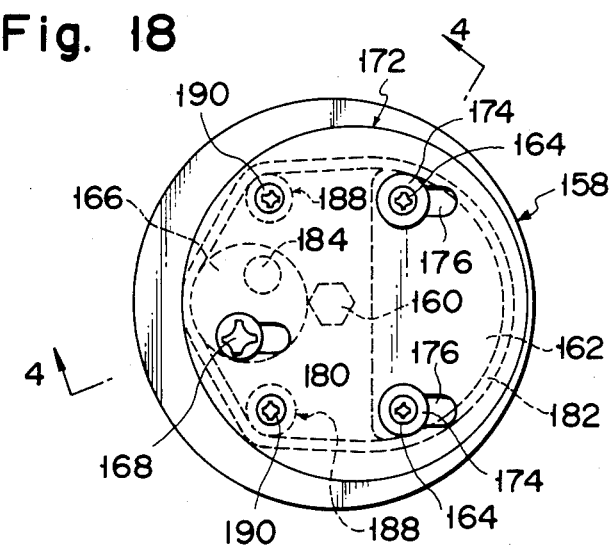
FIG. 18 is a plan view of a tape clamping mechanism in the embodiment of FIG. 16, illustrating the condition thereof prior to a tape clamping operation.
Figure 19:
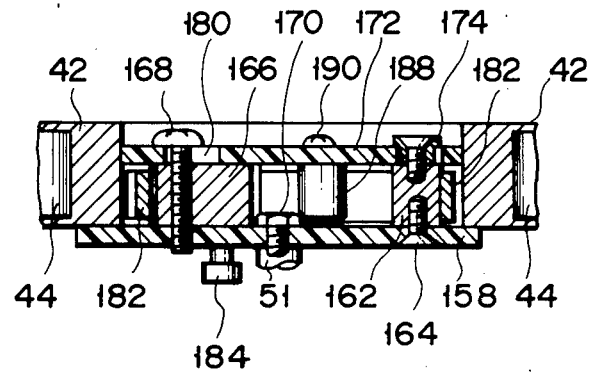
FIG. 19 is a cross-sectional view of the tape clamping mechanism corresponding to the condition shown in FIG. 18.
Figure 20:
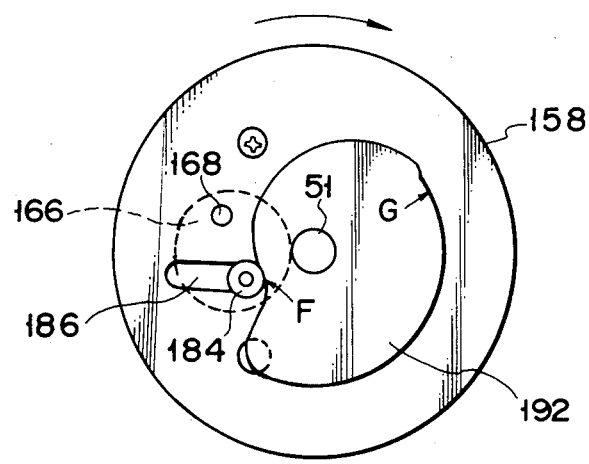
FIG. 20 is a plan view illustrating the operation of a cam mechanism in the clamping mechanism, prior to a reel clamping operation.

The mechanism for clamping the reel 42 on shaft 51 of drive motor 50 will now be described, referring to FIGS. 17 to 3. FIG. 17 is a vertical cross-sectional view of tape supply section 14 before automatic clamping of the reel is performed. FIG. 18 is a plan view of the reel clamping mechanism. FIG. 19 is a cross-sectional view of the embodiment of FIG. 18, taken in the direction of arrows 4—4, and FIG. 20 is a plan view of a portion of the embodiment of FIG. 17, taken in the direction of arrows 5—5 in FIG. 17. In FIGS. 17 to 10, the shaft 51 of drive motor 50 is fixedly attached to a rotary disc 158 by bolt 160, to thereby rotate with shaft 51. A position determining block 162 is fixedly attached to the top face of rotary disc 158 by screws 164, while an eccentric disc cam 166 is rotatably mounted by a screw 168, on the opposite side of shaft 51 from position determining block 162. In this way, an upper disc 172 is supported for horizontal sliding motion with respect to rotary disc 158. That is to say, position determining block 162 is fixedly attached to rotary disc 158 by screws 164, and supports the lower face of upper disc 172, while washers 174 positioned over elongated apertues 176 formed in upper disc 172 bear against the upper face of upper disc 172. The eccentric disc cam 166 is rotatably coupled to rotary disc 158 by screw 168, passing through elongated aperture 180 formed in upper disc 172, so that eccentric disc cam 166 also supports the lower face of upper disc 172. Numeral 182 denotes an annular rubber belt which passes around position determining block 162 and eccentric disc cam 166 as shown in FIG. 18.

The position determining block 162 is fixed in a position such that the distance from the center of shaft 152 to the outer face of annular rubber belt 182 is identical to the radius of the mounting aperture in reel 42. In this way, the radius of curvature of the outer face of annular rubber belt 182 is made identical to the radius of that mounting aperture.

A guide pin roller 184 is provided on the lower face of eccentric disc cam 166, having a shaft which passes through an elongated aperture 186 formed in rotary disc 158. As stated above, the upper disc 172 is mounted for sliding movement in the horizontal direction with respect to rotary disc 158, and in addition two pillars 188 are fixed by screws 190 in upper disc 172. The lower end of each of pillars 188 slides freely over the upper face of rotary disc 158. The annular rubber belt 182 passes over and in contact with these pillars 188, around position determining block 162, and around eccentric disc cam 166.

As shown in FIG. 20, a cam 192 having the contour shown is rotatably mounted on shaft 152 of drive motor. A groove 192a is formed around the periphery of cam 192, while a protrusion 192b is formed within groove 192a as shown in FIG. 17. Numerals 192 denotes a solenoid equipped with an operating rod 196. Normally, rod 196 is held in a retracted condition as shown in FIG. 17, by the action of a spring 198. However when clamping of reel 42 is to be initiated, solenoid 194 is energized while motor shaft 152 is rotated at a relatively slow speed, whereby rod 196 is pushed outward to engage within groove 192a. When protrusion 192b engages rod 196, then rotation of cam 192 is halted. Then, as a result of the rotation of rotary disc 158 (which is rotating as a unit with shaft 152 of drive motor), guide pin roller 184 of cam 192 follows the outer contour of cam 192, whereby eccentric disc cam 166 moves with a floating motion about screw 168 as a center of rotation. As a result of this rotation of eccentric disc cam 166, it is moved peripherally outward, and thereby presses annular rubber belt 182 into contact with the left hand side (as viewed in FIG. 17) of the side wall of the mounting aperture in reel 42. As eccentric disc cam 166 moves farther in the peripherally outward direction, reel 42 is moved in the direction indicated by arrow Z in FIG. 17, whereby the right hand side of of the inner periphery of the central aperture in reel 42 (indicated as R in FIG. 17) becomes pressed against the peripheral surface of upper disc 172, acting through annular rubber belt 182 positioned between them. When this occurs, movement of upper disc 172 and reel 42 in the direction Z is halted.

At this time, 2-point contact is established between the inner periphery of the mounting aperture in reel 42 and position determining block 162 and eccentric disc cam 166, acting through annular rubber belt 182, which serves to clamp reel 42 accurately in a central position, concentric with shaft 152 of drive motor 151.

Furthermore, when eccentric disc cam 166 moves in a peripherally inward direction, i.e. is pulled inward, then as a result of the tensile force produced by annular rubber belt 182, forces are applied to pillars 188 which act in the opposite direction to direction Z, i.e. which act toward the right as seen in the diagrams. As a result, upper disc 172 is returned to its original position. In this way, upper disc 172 slides horizontally with respect to rotary disc 158.

The shape of the periphery of annular rubber belt 182 before reel clamping is performed is shown in FIGS. 17 to 19. In all of the positions shown, annular rubber belt 182 is disposed within the periphery of upper disc 172, to thereby facilitate setting reel 42 on rotary disc 158. That is to say, the inner diameter of the mounting aperture in reel 42 is slightly larger than the diameter of upper disc 172. Thus as described above, when eccentric disc cam 166 is rotated, then when a condition is reached in which reel 42 is clamped in place, the portion of annular rubber belt 182 which passes over the arc-shaped portion of the periphery of position determining block 162 attains substantially the same contour as the periphery of upper disc 172. In addition, the external face of annular rubber belt 182, passes around eccentric disc cam 166, projects slightly beyond the periphery of upper disc 172, while the distance from the upper face of rotary disc 158 to the lower face of upper disc 172 is made slightly less than the width of reel 42.

The operation of the above reel clamping mechanism can be summarized as follows. When reel 42 is to be clamped in place, it is first set on rotary disc 158. The solenoid 194 is then energized, whereby rod 196 is pushed into groove 198 in cam 192. Drive motor 151 is then energized such as to rotate shaft 152 relatively slowly in the direction indicated by arrow 30, with rotary disc 158 and cam 192 being thereby rotated in the same direction. Within one half-revolution of motor shaft 152, rod 196 catches on the protrusion 17b in groove 192a, whereby cam 192 is restrained against further rotation. However, rotary disc 158 continues to rotate, so that differential rotation occurs between rotary disc 158 and cam 192. That is to say, rotary disc 158 rotates with respect to cam 192 in the direction shown by the arrows in FIG. 20. At this time, guide pin roller 184 of eccentric disc cam 166 follows the profile portion F-G of cam 192, so that eccentric disc cam 166 moves in a peripherally outward direction, rotating about screw 168. As a result of this outward motion of eccentric disc cam 166, it becomes pressed against the left side L of the mounting aperture in reel 42, acting through annular rubber belt 182. As eccentric disc cam 166 continues to be moved peripherally outward, it pushes 42 in the direction indicated by arrow Z in FIG. 17. Finally, side portion R of the inner wall of the mounting aperture in reel 42 is pressed against position determining block 162, acting through annular rubber belt 182. Reel 42 is now firmly clamped to rotary disc 158. The solenoid 194 is then deenergized, whereby rod 196 is retracted.

Figure 21:
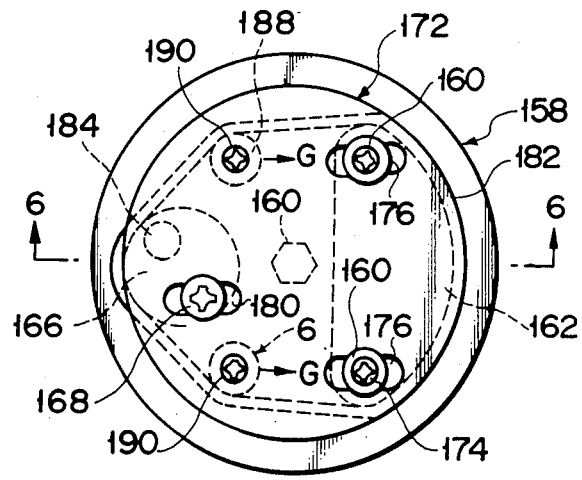
FIG. 21 is a plan view of the tape clamping mechanism, illustrating the condition with a tape reel in the clamped status.
Figure 22:
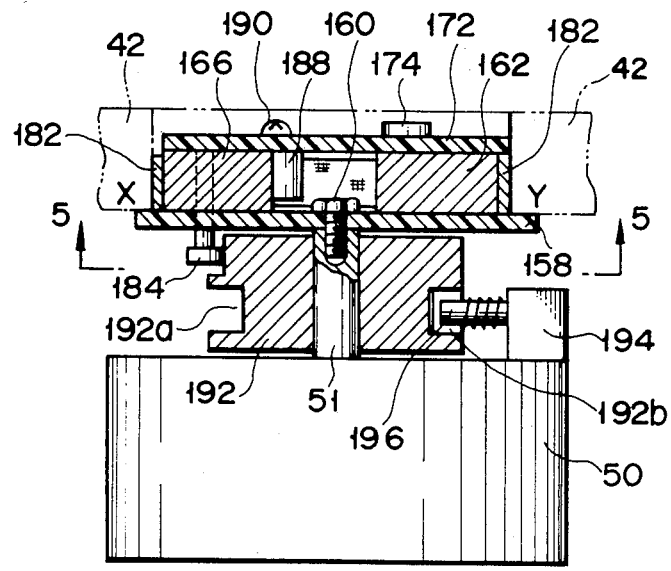
FIG. 22 is a cross-sectional view of the tape clamping mechanism, illustrating the condition thereof after a tape reel clamping operation, prior to retraction of a solenoid rod.
Figure 23:
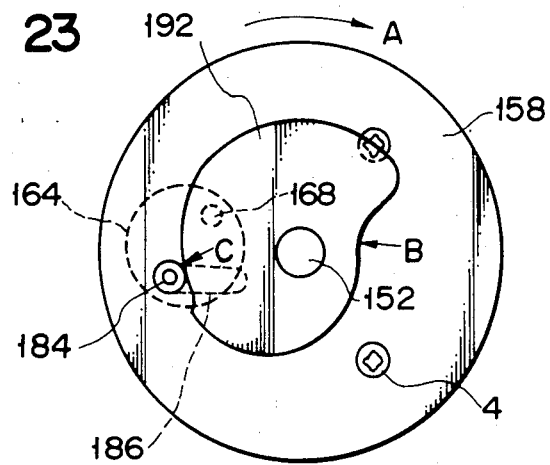
FIG. 23 is a plan view of the cam mechanism, corresponding to the condition shown in FIG. 21 and 22.

The clamped status described above, at the point when clamping has been completed but solenoid rod 196 has not yet been retracted, is shown in the plan view of FIG. 21 and the vertical cross-sectional view of FIG. 22, taken in the direction of arrows 6—6. FIG. 23 shows the position of cam 192 at this time.

The manner in which reel 42 is unclamped is as follows. First, solenoid 194 is actuated, to thereby extend rod 196 into groove 192a in cam 192. The drive motor shaft 152 is then rotated relatively slowly in the opposite direction to that indicated by the arrow in FIG. 20. Within one half-revolution of shaft 152, rod 196 engages against protrusion 192b in groove 192a, so that rotation of cam 192 is halted. However rotary disc 158 continues to rotate, whereby differential rotation occurs between rotary disc 158 and cam 192. As a result, guide pin roller 184 follows the contour portion G-F of cam 192, so that the portion of annular rubber belt 182 which passes around pillars 188 exerts a tensile force acting such as to pull pillars 188 in the direction opposite to that shown by arrow Z in FIG. 17, whereby upper disc 172 and reel 158 are moved in the opposite direction to that of arrow Z. In this way, reel 42 is released from attachment to rotary disc 158.

As shown in the drawings, the portions of the external face of annular rubber belt 182 which pass around position determining block 162 and eccentric disc cam 166 come within the periphery of upper disc 172, and thereby become displaced from the inner aperture in reel 42. The condition prior to clamping the reel has now been restored. The solenoid 194 is then re-energized, so that rod 196 is retracted. Reel 42 can now be removed from upper dics 172.

With an automatic reel clamping mechanism having the configuration described above, reel 42 is clamped to rotary disc 158 at two support points. One of these support points is fixed in place, and so can be determined to a high degree of precision, while the other support point is movable. As a result of this arrangement, reel 42 is clamped in position with a high degree of accuracy, and in addition this arrangement ensures that reel 42 will be held in a precisely concentric relationship with the drive motor shaft 152. Use of two support points in this way also has the advantage of simplifying the overall mechanical configuration of the automatic reel clamping mechanism.

Figure 24:
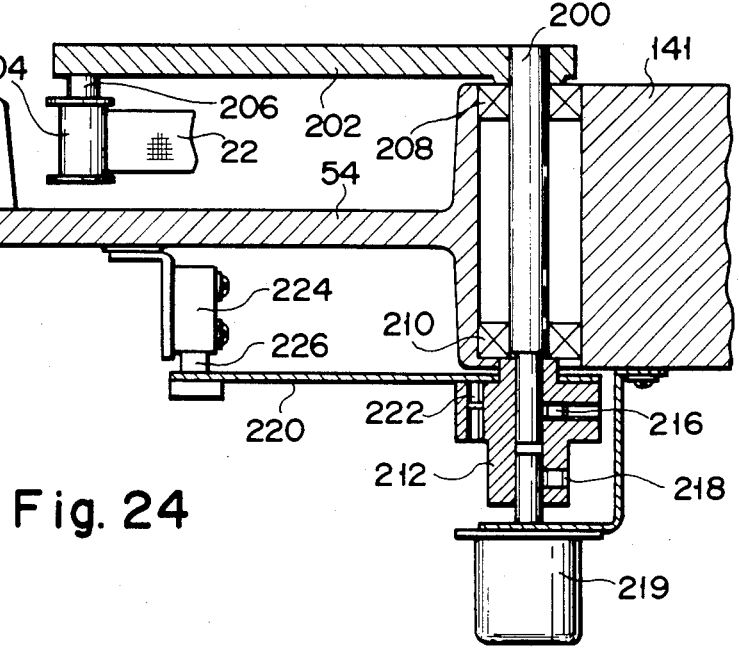
FIG. 24 is a cross-sectional view for illustrating a micro-switch actuation mechanism in a tape tension application mechanism of the embodiment of FIG. 16.

FIG. 24 is a cross-sectional view through the tension application mechanism of the embodiment of FIG. 16, taken in the direction of arrows 6—6. The top of a shaft 200 is fixedly attached in an aperture in one end of tension arm 202, while the other end of tension arm 202 supports a roller 204 which is rotatably mounted thereon by a pin 206. Roller 204 serves to guide tape 22. Shaft 200 is rotatably mounted on base 25 by bearings 208 and 210. A connecting member 212 is mounted on the lower end of shaft 200, and serves to coupled shaft 200 to the shaft of a potentiometer 219. The connecting member 212 is fixedly attached to shaft 200 and the shaft of potentiometer 219 by mounting screws 216 and 218.

A rotation angle detection lever 220 is fixed to connecting member 212 by a screw 222. A micro-switch 224 is positioned such that an actuator 226 thereof attached to the underside of base portion 228 is arranged to be depressable by one end of rotation angle detection lever 220. When tension arm 202 is displaced due to some reason as the tension in tape 22, then shaft 200 is rotated accordingly, and rotation angle detection lever 220 coupled thereto is also rotated. When the amount of angular rotation is tension arm 202 exceeds a predetermined amount, then rotation angle detection lever 220 depresses actuator 226 of micro-switch 224, to thereby actuate microswitch 224.

Figure 25:
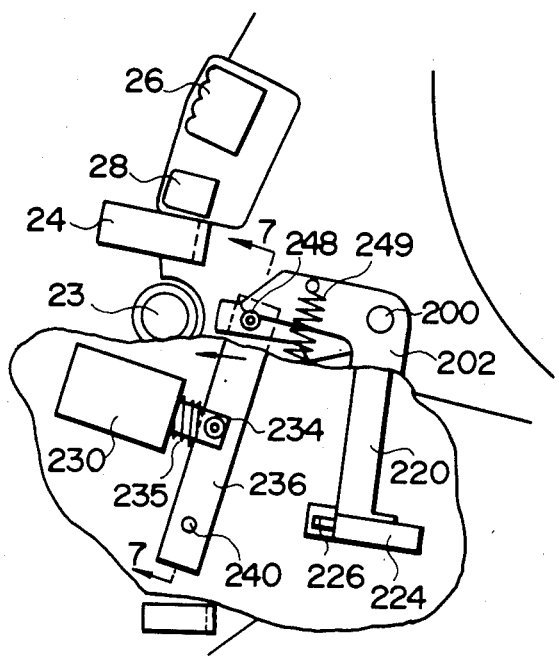
FIG. 25 and FIG. 26 are partial views in plan and cross-section for illustrating the tension application mechanism in the embodiment of FIG. 16.
Figure 26:
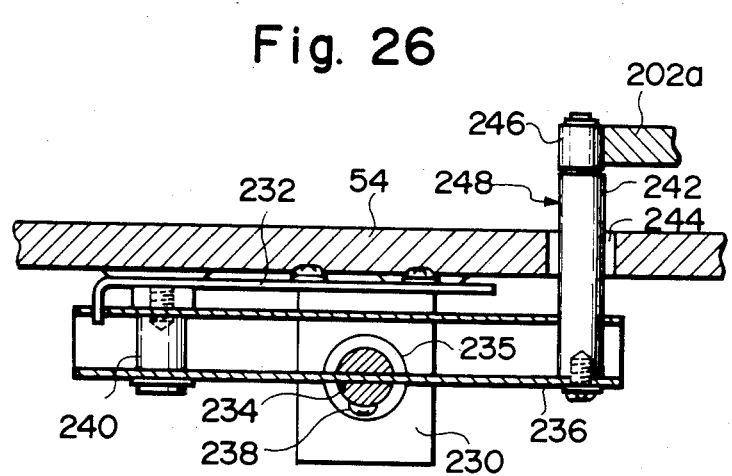

FIG. 25 is a partial plan view for describing the arrangement of parts in the vicinity of tension arm 202 and the rotation angle detection means of FIG. 24. FIG. 26 is a cross-sectional view taken in the direction of arrows 7—7 in FIG. 25, showing means for driving a latch pin. In FIGS. 25 and 26, a solenoid 230 is fixedly attached to the underside of base portion 166, by a solenoid attachment plate 232. A slot is formed in the outer end of operating rod 234 of solenoid 230, and a latch lever 236 having a rectangular shape open at one side, as viewed in cross-section, is engaged in this slot by means of a screw 238. One end of latch lever 236 is rotatably supported on base 166 by a shaft 240, while the other end of lever 236 is fixedly attached to shaft 242 of latch pin 248. Shaft 224 protrudes through an aperture 244 which is formed in base portion 228, and pawl portion 202a of tension arm 202 is disposed such as to contact roller 246 on the other end of shaft 242.

With this configuration, when the drive means coupled to latch pin 248 are activated, that is when solenoid 230 is energized, then operating rod 234 of solenoid 230 is drawn into the solenoid, whereby latch pin 248 moves towards solenoid 230, rotating about shaft 240. Thus, latch pin 248 moves from right to left, as indicated by the arrow in FIG. 25, i.e. moves from the front towards the rear, as viewed in FIG. 24 As a result, pawl portion 202a of tension arm 202 becomes disengated from latch pin 248, thereby freeing tension arm 202. Thus, tension arm 202 is pulled into the position shown by the broken-line outline in FIG. 16, by the tension force exerted by spring 249.

Figure 27A:
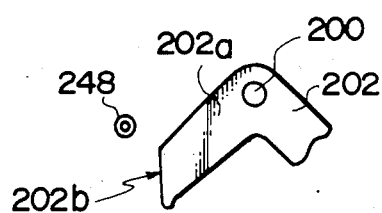
FIGS. 27a to 27d are partial views in plan to illustrate various conditions of a tension arm in the tension application mechanism of FIG. 16.
Figure 27C:
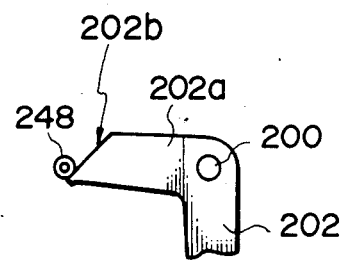
Figure 27B:
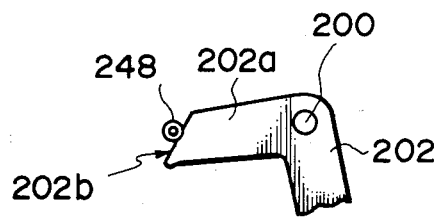
Figure 27D:
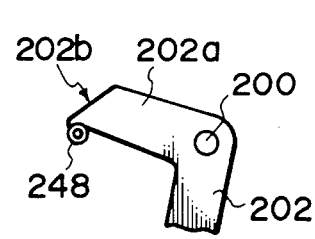

FIGS. 27a to 27d are diagrams for describing the engaging relationships between the latch pin 248 are the pawl portion 202a of tension arm 202, and show tension arm 202 moves from the position shown by the broken-line outline in FIG. 16 into position K, by the interaction between pawl portion 202a of tension arm 202 and latch pin 248 i.e. show how tension arm 202 is moved to the left, as viewed in FIG. 22. When the magnetic tape drive unit is operating in the normal read or write mode, then pawl portion 202a of tension arm 202 is disposed in a position which is separated from latch pin 248, as shown in FIG. 27a, i.e. position M. When the tension arm 202 is moved to the left from position M, then as shown in FIGS. 27c, pawl portion 202a (or more specifically the linear contour portion 202b of pawl portion 202a) acts to rotate roller 246 of latch pin 248, while in addition pawl portion 202a presses latch pin 248 towards the left. As this is taking place, although solenoid 230 is in the de-energized state, operating rod 234 is moved towards solenoid 230 and spring 235 is compressed. As tension arm 202 moves further to the left, roller 246 of latch pin 248 becomes separated from the linear portion 202 of pawl portion 202a of tension arm 202, so that due to the force exerted by compressed spring 235, latch pin 248 is moved to the right. As a result, as shown in FIG. 27d, tension arm 202 becomes latched in the position shown.

The operation whereby tension arm 202 is retracted will now be described. It will be assumed that the tape is to be rewound from take-up hub 49 onto reel 42 in tape supply section 14. This is performed by rotating reel 42 in the counterclockwise direction. While this is taking place, tension arm 202 is held in position M (indicated by the broken-line outline) in the same way as during read or write operations, so that pawl portion 202a of tension arm 202 is in the position shown in FIG. 27a. When rewinding of the tape is almost completed, then the tape end/start detection section 24 senses the BOT mark on tape 22, and produces a detection signal. In response to this, tape drive section 900 sends a signal to tape take-up section 16 designating that rotation of take-up hub 49 be halted or the hub set into reverse rotation. When this takes place, tension is applied to tape 22, and so to the portion thereof which is guided onto roller 204 on the end of tension arm 202. As a result of this tension, tension arm 202 moves towards position K, and shaft 200 moves in accompaniment to this movement of tension arm 202. This rotation of shaft 200 serves to rotate rotation angle detection lever 220 about the axis of shaft 200. As the tension applied to tape 22 acting on roller 204 increases, tension arm 202 moves to position K (shown by the full-line outline), so that pawl portion 202a engages with latch pin 248, as illustrated in FIG. 27d, i.e. in a latching relationship. As the tension applied to tape 22 increases further, so that tension arm 202 moves from position K further towards the left, the rotation angle detection lever 220 depresses actuator 226 of micro-switch 224, thereby actuating micro-switch 224. The micro-switch 224 is positioned such as to be actuated when tension arm 202 is displaced by an angle of more than a predetermined value. Tape control unit 900 responds to the actuation of micro-switch 224 by producing control signals which set take-up hub 49 in a condition in which it can freely rotate. The tension of tape 22 is thereby reduced, whereby the tape can be completely rewound onto reel 42. While this takes place, tension arm 202 is latched in position K, i.e. in the retracted condition, so that the tape transport path 18 is wide and clear. In this way, the free end of the tape can easily move along tape transport path 18 past tension application mechanism 20 when the next automatic tape attachment operation is carried out.

The micro-switch 224 also serves to produce a tape attachment confirmation signal when automatic tape attachment onto take-up hub 49 is implemented, to indicate that the tape has been corrently wound onto the hub. That is to say, as in the embodiment of FIG. 1, the speed of rotation of take-up hub 49 is made higher than that of reel 42 while automatic tape attachment is in progress, so that tension is applied to the tape. As a result of this tension, tension arm 202 is moved from position K towards the left, and micro-switch 224 is thereby actuated. This actuation produces an attachment confirmation signal. If such an actuation does not occur within a predetermined time, then tape 22 is rewound on reel 42, and automatic tape attachment operation is re-executed, in the same way as for the embodiment of FIG. 1.

After performing automatic tape attachment, i.e. with the tape correctly attached to the take-up hub, then a control signal is sent to solenoid 230 acting to energize solenoid 230. As a result, operating rod 234 moves ratchet lever 236 towards solenoid 230, whereby latch pin 248 becomes disengaged from pawl portion 202a of tension arm 202. Thus, tension arm 202 is pulled by the force exerted by spring 249 into position M (shown by the broken-line outline in FIG. 16), thereby applying a predetermined amount of tension to the tape.

It should be noted that although in the above description, rotation angle detection lever 220 actuating microswitch 224 constitutes rotation angle detection means, it is equally possible to use various other means for this. For example, such sensing can be carried out by using potentiometer 219 mounted on the lower end of shaft 200. Furthermore, various other means can be envisaged for moving latch pin 248, besides solenoid 230.

Although the present invention has been described in the above with reference to a specific embodiment, it should be noted that various changes and modifications to the embodiment may be envisaged, which fall within the scope claimed for the invention as set out in the appended claims. The above specification should therefore be interpreted in a descriptive and not in a limiting sense.

We claim:

1. An automatic-threading horizontal type of magnetic tape drive unit, comprising:
   a housing with the interior thereof horizontally disposed;
   a base horizontally disposed within said housing;
   a tape supply section disposed on said base, comprising means for retaining and rotating about a substantially vertical axis a tape reel having a coil of magnetic tape wound thereon terminating in a free end;
   a tape take-up section disposed on said base, comprising a take-up hub and means for supporting and rotating said take-up hub about a substantially vertical axis;
   an S-shaped tape transport path means formed as an open channel in said base and extending between said tape supply section and said tape take-up section, said tape transport path means defining a tape transport path for said magnetic tape;
   magnetic head means disposed at a position along said tape transport path between said tape supply section and said tape take-up section, for performing read and write operations on said magnetic tape;
   a source of air under high pressure;
   a plurality of high-pressure air outlets for producing high pressure air flows, supplied with air from said high-pressure air source, and disposed variously adjacent to the periphery of said tape reel and at positions along said tape transport path, for directing said high-pressure air flows such as to separate said tape free end from adjacent portions of said magnetic tape wound on said tape reel and to guide and transport said tape free end after said separation, along a substantially central region of said tape transport path to said tape take-up section;
   winding securing means disposed in said tape take-up section, acting to wind said magnetic tape onto said takeup hub after said tape free end has been transported to said tape take-up section by said high-pressure air flows;
   a main tension arm operable to be moved between a first position in which said main tension arm is disposed substantially outside said tape transpoft path and a second position in which said main tension arm extends into said tape transport path such that said main tension arm bears against said magnetic tape and deflects said magnetic tape from said tape transport path to thereby produce a predetermined amount of tension;
   an auxiliary tension arm rotatable about a substantially vertical axis between a first and a second stable position, spring means biasing said auxiliary tension arm in said first and second stable positions, said auxiliary tension arm being in said first stable position prior to winding said magnetic tape onto said take-up hub, said tape being subjected to tension immediately after said tape is wound onto said take-up hub such that a portion of tape which has just been tensioned bears against said auxiliary tension arm and thereby rotates said auxiliary tension arm from said first stable position to an intermediate position, said intermediate position being between said first and second stable positions;
   switch means actuated by said auxiliary tension arm when said auxiliary tension arm is rotated from said first position to said intermediate position, said actuated switch means generating a signal to move said main tension arm from said first to said second position thereof;
   said auxiliary tensionarm being disposed within the path of movement of said main tension arm such that said main tension arm contacts a portion of said auxiliary tension arm where said main tension arm moves from said first position toward said second position, said main tension arm in moving from said first towards said second position thereby shifting said auxiliary tension arm from said intermediate position to said second stable position.

2. An automatic-threading horizontal type of magnetic tape drive unit according to claim 1 wherein said spring means is connected to said auxiliary tension arm to bias said auxiliary tension arm in one rotational direction when said auxiliary tension arm is in said first stable position and to bias said auxiliary tension arm in an opposite rotational direction when said auxiliary tension arm is in said second stable position.

3. An automatic-threading horizontal type of magnetic tape drive unit according to claim 2 wherein said spring means biases said auxiliary tension arm in said one direction when said auxiliary tension arm is in said intermediate position.

4. An automatic-threading horizontal type of magnetic tape drive unit according to claim 1 wherein said spring means is connected to said auxiliary tension arm such that said spring means extends on one side of said axis of rotation of said auxiliary tension arm when said auxiliary tension arm is in said first stable position and said spring means extends on an opposite side of said axis of rotation of said auxiliary tension arm when said auxiliary tension arm is in said second stable position.

5. An automatic-threading horizontal type of magnetic tape drive unit according to claim 1 wherein said auxiliary tension arm comprises a first contact arm and a second contact arm, said magnetic tape contacting said first contact arm to move said auxiliary tension arm from said first stable position to said intermediate position, said main tension arm contacting said second contact arm to move said auxiliary tension arm from said second stable position to said first stable position.

6. An automatic-threading horizontal type of magnetic tape drive unit according to claim 5 wherein said second contact arm is connected to said first contact arm and extends from said first contact arm at an angle other than a straight angle.

7. An automatic-threading horizontal type of magnetic tape drive unit according to claim 6 wherein said first contact arm is disposed in the path of movement of said main tension arm when said auxiliary tension arm is in said intermediate position, said main tension arm being rotatable from said first position to said second position to contact said first contact arm to thereby rotate said auxiliary tension arm from said intermediate position to said second stable position.

8. An automatic-threading horizontal type of magnetic tape drive unit according to claim 1 wherein said switch means comprises a switch-actuating part movable between a non-actuating position and an actuating position, said switch-actuating part being in said non-actuating position when said auxiliary switch means is in said first stable position, said switch-actuating part being in said switch actuating position when said auxiliary tension arm is in said intermediate position.

9. An automatic-threading horizontal type of magnetic tape drive unit according to claim 8 wherein said main tension arm is disposed on one side of said tape as said tape moves along said transport path and said auxiliary tension arm is disposed on an opposite side of said tape as said tape moves along said transport path.

* * * * *